United States Patent
Angara et al.

(10) Patent No.: US 11,496,446 B1
(45) Date of Patent: Nov. 8, 2022

(54) PROTECTING PERSONALLY IDENTIFIABLE INFORMATION SUBMITTED THROUGH A BROWSER

(71) Applicant: NortonLifeLock Inc., Tempe, AZ (US)

(72) Inventors: SriHarsha Angara, Fremont, CA (US); Venkadesan Marimuthu, Chennai (IN); Aditya Subhash Sumant, Chennai (IN); Arun Ganesan, Chennai (IN); Mahesh Kamsala, Cypress, CA (US); Rahuraman Kaliyaperumal, Chennai (IN); A.Ramachandra Reddy, Nellore dt (IN)

(73) Assignee: NORTONLIFELOCK INC., Tempe, AZ (US)

( * ) Notice: Subject to any disclaimer, the term of this patent is extended or adjusted under 35 U.S.C. 154(b) by 266 days.

(21) Appl. No.: 16/880,287

(22) Filed: May 21, 2020

(51) Int. Cl.
*H04L 9/40* (2022.01)
*G06F 21/62* (2013.01)
*G06F 16/955* (2019.01)
*H04L 9/06* (2006.01)
*H04L 9/00* (2022.01)

(52) U.S. Cl.
CPC ........ *H04L 63/0428* (2013.01); *G06F 16/955* (2019.01); *G06F 21/6245* (2013.01); *H04L 9/0637* (2013.01); *H04L 9/50* (2022.05)

(58) Field of Classification Search
CPC ............. H04L 63/0428; H04L 69/0637; G06F 16/955; G06F 21/6245
USPC ........................................................ 726/26
See application file for complete search history.

(56) References Cited

U.S. PATENT DOCUMENTS

| 8,019,689 | B1 * | 9/2011 | Nachenberg | G06Q 20/027 705/79 |
| 8,898,272 | B1 * | 11/2014 | Young | H04L 63/0407 709/224 |
| 2008/0270802 | A1 * | 10/2008 | Ashley | G06F 21/10 713/184 |

(Continued)

OTHER PUBLICATIONS

Osano; "PII Tracking API"; Webpage; located at : https://www.osano.com/features/pii-tracking-api; accessed on May 20, 2020; 3 pages.

(Continued)

*Primary Examiner* — Dant B Shaifer Harriman
(74) *Attorney, Agent, or Firm* — Maschoff Brennan

(57) ABSTRACT

Protecting PII submitted through a browser. In some embodiments, a method may include detecting multiple PII of a user submitted to multiple organization websites through a browser. The method may also include encrypting each of the PII. The method may further include storing each of the encrypted PII along with an identifier of the organization website to which the PII was submitted. The method may also include receiving a request to view the PII along with an indicator of the organization website to which the PII was submitted. The method may further include retrieving each of the encrypted PII along with the identifier of the organization website to which the PII was submitted. The method may also include decrypting each of the encrypted PII. The method may further include displaying each of the PII along with the indicator of the organization website to which the PII was submitted.

13 Claims, 5 Drawing Sheets

(56) References Cited

U.S. PATENT DOCUMENTS

| | | | | |
|---|---|---|---|---|
| 2011/0191664 | A1* | 8/2011 | Sheleheda | G06F 17/00 709/224 |
| 2012/0210119 | A1* | 8/2012 | Baxter | G06Q 30/0253 713/150 |
| 2017/0316409 | A1* | 11/2017 | Smith | G06Q 20/3276 |
| 2019/0034808 | A1* | 1/2019 | Palanichamy | G06Q 30/0201 |
| 2019/0266355 | A1* | 8/2019 | Lockhart, III | G06F 21/6263 |
| 2019/0349351 | A1* | 11/2019 | Verma | G06F 21/552 |
| 2019/0377900 | A1* | 12/2019 | Balzer | G06F 21/6254 |
| 2020/0401728 | A1* | 12/2020 | Lockhart, III | G06F 21/6263 |
| 2021/0200902 | A1* | 7/2021 | Brannon | G06F 21/6263 |
| 2021/0279365 | A1* | 9/2021 | Apsingekar | G06F 21/6254 |
| 2022/0035952 | A1* | 2/2022 | Brannon | G06F 21/6263 |

OTHER PUBLICATIONS

Sovrin; "Control your digital identity"; Webpage; located at: https://sovrin.org/; accessed on May 20, 2020; 4 pages.

* cited by examiner

PROTECTING PERSONALLY IDENTIFIABLE INFORMATION SUBMITTED THROUGH A BROWSER

BACKGROUND

As users interact more and more with websites on the Internet, websites operated by organizations ("organization websites") gather an increasing amount of information related to the users. The gathering of information related to users presents a variety of security and privacy concerns for users. To address these concerns, various governments have imposed laws or regulations on organizations regarding the collection, storage, and sharing of personally identifiable information (PII). PII generally relates to any information that can be used to distinguish or trace an individual's identity (such as name, social security number, date and place of birth, mother's maiden name, or biometric records) and any other information that is linked or linkable to an individual (such as medical, educational, financial, and employment information). Some examples of these laws include European Union's General Data Protection Regulation (GDPR) and the California Consumer Privacy Act (CCPA). Although these laws and regulations vary, many include the right of an individual to request that their PII be deleted by an organization website (e.g., known as the "right to be forgotten" in the GDPR).

Unfortunately, because each user generally interacts with a large number of organization websites (e.g., shopping websites, social media websites, news websites, video streaming websites, etc.), it can be difficult for the user to remember all of the organization websites with which the user has shared PII. Therefore, in the event that the user decides to request that their shared PII be deleted, it may be difficult for the user to determine which organization websites possess their PII. Therefore, it can be difficult for users to protect their PII that they have shared with organization websites.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for protecting PII submitted through a browser may be performed, at least in part, by a computer device including one or more processors. The method may include detecting multiple PII of a user submitted to multiple organization websites through a browser. The method may also include encrypting each of the PII. The method may further include storing each of the encrypted PII along with an identifier of the organization website to which the PII was submitted. The method may also include receiving a request to view the PII along with an indicator of the organization website to which the PII was submitted. The method may further include retrieving each of the encrypted PII along with the identifier of the organization website to which the PII was submitted. The method may also include decrypting each of the encrypted PII. The method may further include displaying each of the PII along with the indicator of the organization website to which the PII was submitted.

In some embodiments, the detecting of the multiple PII may be performed by the browser and/or may be performed by a plugin of the browser.

In some embodiments, each of the encrypted PII may be stored locally and/or may be stored in a blockchain.

In some embodiments, the method may further include receiving a request from the user for a selected one of the PII to be deleted by the organization website to which the selected one of the PII was submitted, combining the selected one of the PII with metadata associated with the selected one of the PII, generating an original hash corresponding to the combined PII and metadata, and sending a request for the organization website to delete the PII associated with the original hash. In these embodiments, the metadata associated with the selected one of the PII may include a Uniform Resource Locator (URL) of the organization website to which the selected one of the PII was submitted. Additionally or alternatively, in these embodiments, the metadata associated with the selected one of the PII may include a type indicator of the selected one of the PII. Additionally or alternatively, in these embodiments, the method may further include storing the original hash in a blockchain. Additionally or alternatively, in these embodiments, the method may further include storing, in a blockchain, the request for the organization website to delete the PII associated with the original hash.

In some embodiments, a computer-implemented method for protecting PII submitted through a browser may be performed, at least in part, by a computer device including one or more processors. The method may include receiving multiple PII of a user submitted to an organization web site through a browser. The method may also include combining each of the PII with metadata associated with the PII. The method may further include generating a verification hash corresponding to each of the combined PII and metadata. The method may also include storing each of the PII along with the corresponding verification hash. The method may further include receiving a request for the organization website to delete PII associated with a specified hash. The method may also include determining that the specified hash matches a particular one of the verification hashes. The method may further include, in response to the determining that the specified hash matches the particular one of the verification hashes, deleting the PII associated with the particular one of the verification hashes.

In some embodiments, the receiving of the multiple PII of the user submitted to the organization website may include receiving the multiple PII of the user submitted in one or more web forms of the organization website.

In some embodiments, the metadata associated with each PII may include a Uniform Resource Locator (URL) of the organization website to which the PII was submitted.

In some embodiments, the metadata associated with each PII may include a type indicator of the PII.

In some embodiments, the determining that the specified hash matches the particular one of the verification hashes may further include determining that the specified hash is found in a blockchain storing hashes corresponding to PII for which deletion is authorized. In these embodiments, the deleting of the PII associated with the particular one of the verification hashes may be further performed in response to the determining that the specified hash is found in the blockchain.

In some embodiments, one or more non-transitory computer-readable media may include one or more computer-readable instructions that, when executed by one or more processors of a computer device, cause the computer device to perform a method for protecting PII submitted through a browser.

In some embodiments, a computer device may include one or more processors and one or more non-transitory computer-readable media. The one or more non-transitory computer-readable media may include one or more computer-readable instructions that, when executed by the one or more processors, cause the computer device to perform a method for protecting PII submitted through a browser.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
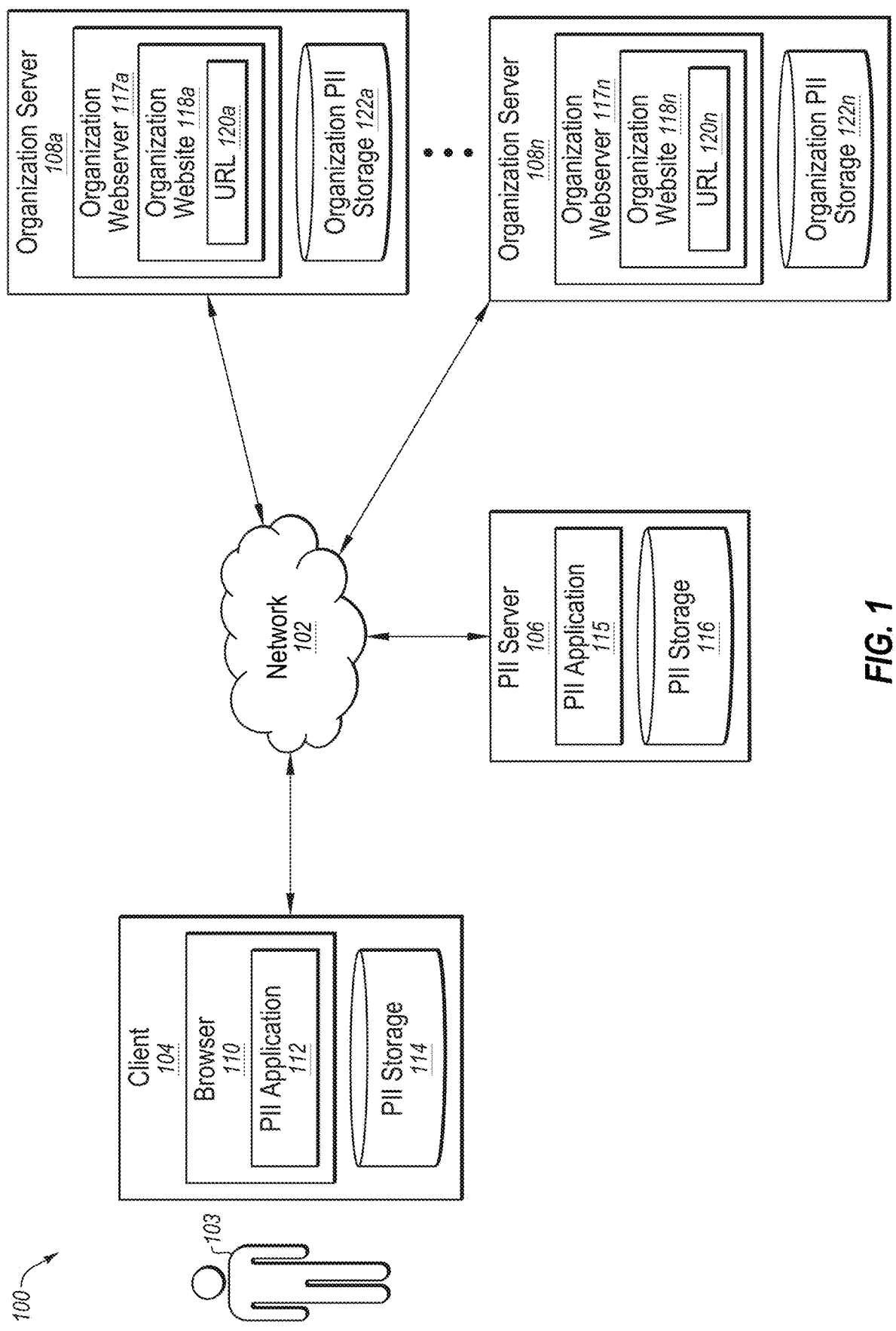
FIG. 1 illustrates an example system configured for protecting PII submitted through a browser.

As users interact more and more with organization websites on the Internet, organization websites gather an increasing amount of users' PII, which presents a variety of security and privacy concerns for users. To address these concerns, various governments have imposed laws or regulations on organizations regarding the collection, storage, and sharing of PII, such as the European Union's GDPR and California's CCPA. Although these laws and regulations vary, many include the right of an individual to request that their PII be deleted by an organization website (e.g., known as the "right to be forgotten" in the GDPR).

Unfortunately, because each user generally interacts with a large number of organization websites, it can be difficult for the user to remember all of the organization website with which the user has shared PII. Therefore, in the event that the user decides to request that their shared PII be deleted, it may be difficult for the user to determine which organization websites possess their PII. Further, even where a user can remember an organization website with which the user has shared their PII, the manual submission of a PII deletion request can be cumbersome and complicated, which can be frustrating to user. Also, some organization websites require that any PII deletion request include a resending of the PII that the user wishes to delete, which raises additional security and privacy concerns. Also, organization websites that receive a PII deletion request may have difficulty locating the PII and/or may be unsure as to whether the PII deletion request is actually authorized by the user to whom the PII belongs. Therefore, it can be difficult for user to protect their PII that they have shared with organization websites.

Some embodiments disclosed herein may enable a user to protect their PII that the user has submitted to organization websites through a browser. In some embodiments, each time that a user submits PII to any organization website through a browser (e.g., by submitting PII through a web form of the organization website), the browser or a plugin to the browser (e.g., a browser extension) may detect the submission of the PII, encrypt the PII, and store the encrypted PII along with an identifier (e.g., a domain or a URL) of the organization website to which the PII was submitted. Then, at any time, the user is able to request a list of all of the shared PII along with an indicator (e.g., website name or organization name) of the organization website to which the PII was submitted. This list may be generated by the browser or the plugin to the browser (or another application) retrieving each of the encrypted PII along with the identifier of the organization website to which the PII was submitted, decrypting each of the encrypted PII, and displaying each of the PII along with the indicator of the organization website to which the PII was submitted. In this manner, even where the user interacts with a large number of organization websites (e.g., hundreds of websites), the browser or browser extension can automatically and securely track all of the PII that the user shares with organization website over time. Then, in the event that the user decides to request that some or all of their shared PII be deleted, the browser or browser extension can quickly generate a list of all of the shared PII along with an indicator of the organization website to which the PII was submitted (as well as potentially other information, such as when the PII was shared, the device from which the PII was shared, etc.), so that the user can easily determine to which organization websites the user would like to send a PII deletion request.

Further in some embodiments, a user may easily request that a selected PII (e.g., that the user selects from the list of all shared PII with a single click) be deleted by the organization website to which the selected PII was submitted. When such a request is received, the browser or browser plugin (or other application) may automatically request deletion of the PII by the organization website on behalf of the user. In this manner, the user can accomplish the deletion of their PII from an organization without the user frustration that can be associated with a cumbersome and complicated manual deletion request.

Also, in some embodiments, this automatic PII deletion request on behalf of the user may be accomplished by combining the PII with metadata (e.g., a URL, a PII type, a timestamp, etc.) associated with the PII, generating an original hash corresponding to the combined PII and metadata, and sending a request for the organization website to delete the PII associated with the original hash. The organization website may then compare this original hash to independently generated verification hashes to determine which PII to delete. In this manner, the original PII need not be sent along with the PII deletion request, thus avoiding additional security and privacy concerns associated with the resending of PII in a PII deletion request.

Further, in some embodiments, this automatic PII deletion request on behalf of the user may include storing the original hash in a blockchain that stores hashes corresponding to PII that has been shared (e.g., to prove the PII was shared with an organization website) and/or for which deletion is authorized. Additionally or alternatively, this automatic PII deletion request on behalf of the user may include storing, in the blockchain, the request for the organization website to delete the PII associated with the original hash. Then, when the organization website receives a PII deletion request with the original hash, the organization website can determine whether the original hash is found in the blockchain to determine whether the PII was ever submitted to the organization website in the first place and/or whether the PII deletion request is actually authorized by the user to whom the PII belongs. If the original hash is found in the blockchain, the organization website may move forward with the deleting of the PII associated with the original hash with confidence that the PII deletion request was actually authorized by the user. In this manner, the organization website that receives a PII deletion request may easily locate the PII (e.g., by looking up the PII by the hash) and/or may be confident that the PII deletion request is actually authorized by the user to whom the PII belongs.

Therefore, using embodiments disclosed herein, a user can more easily protect their PII that they have shared with organization websites through their browser, even where the user generally interacts with a large number of organization websites and is unable to remember all of the organization websites with which the user has shared PII.

Turning to the figures, FIG. 1 illustrates an example system 100 configured for protecting PII submitted through a browser. The system 100 may include a network 102, a client 104, a PII server 106, and organization servers 108a-108n.

In some embodiments, the network 102 may be configured to communicatively couple the client 104, the PII server 106, and the organization servers 108a-108n to one another and to other network devices using one or more network protocols, such as the network protocols available in connection with the World Wide Web. In some embodiments, the network 102 may be any wired or wireless network, or combination of multiple networks, configured to send and receive communications (e.g., via data packets) between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 3:
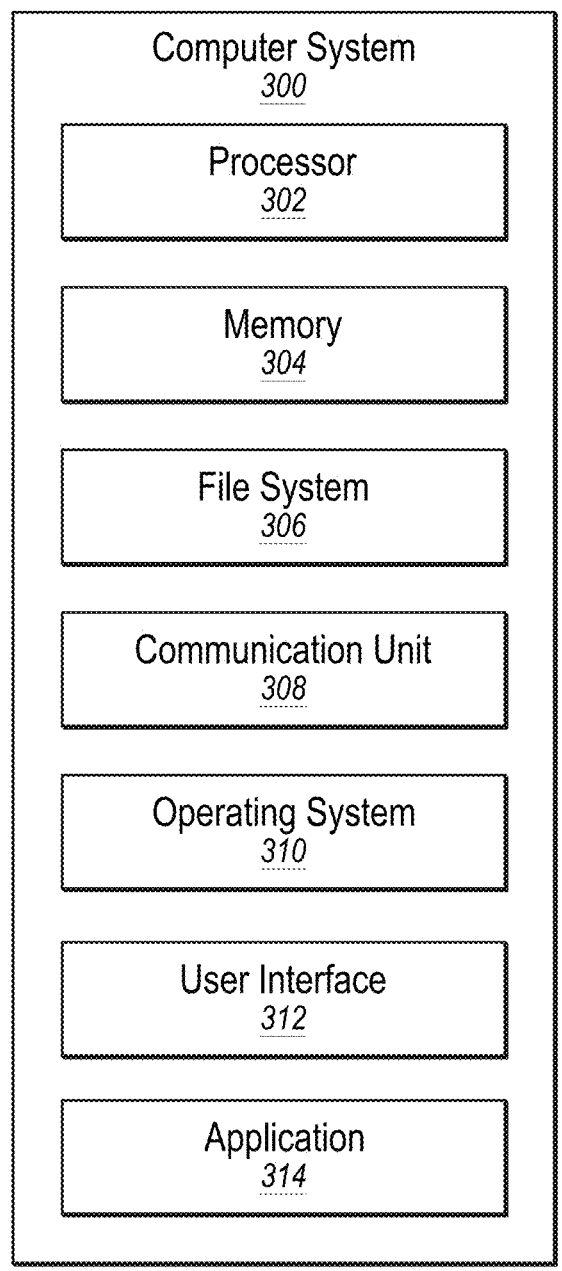
FIG. 3 illustrates an example computer system that may be employed in protecting PII submitted through a browser.

In some embodiments, the client 104 may be any computer systems, or combination of multiple computer systems, capable of communicating over the network 102 and executing one or more client applications such as the browser 110, examples of which are disclosed herein in connection with the computer system 300 of FIG. 3. For example, the client 104 may be employed by a user 103 to visit websites using the browser 110. The client 104 may also include a PII application 112 and a PII storage 114. The PII application 112 may be a browser plugin to the browser 110, may be integrated into the browser 110, may be a separate application, or may be some combination thereof. In some embodiments, the PII application 112 may be part of, or include some or all of the functionality of, Norton™ Safe Web or Norton™ Password Manager.

In some embodiments, the PII server 106 may be any computer system, or combination of multiple computer systems, capable of communicating over the network 102 and capable of employing a PII application 115 to help protect PII submitted through browsers, examples of which are disclosed herein in connection with the computer system 300 of FIG. 3. The PII server 106 may also include a PII storage 116.

In some embodiments, the organization servers 108a-108n may each be any computer system, or combination of multiple computer systems, capable of communicating over the network 102 and capable of hosting one or more server applications such as the organization webservers 117a-117n, examples of which are disclosed herein in connection with the computer system 300 of FIG. 3. The organization webservers 117a-117n may host organization websites 118a-118n, and/or other digital content, which may be addressable at URLs 120a-120n. The organization servers 108a-108n may also include organization PII storages 122a-122n.

In some embodiments, each time that the user submits PII to any of the organization websites 118a-118n through the browser 110 (e.g., by submitting PII through a web form of the organization websites 118a-118n), the PII application 112 and/or the PII application 115 may detect the submission of the PII, encrypt the PII, and store the encrypted PII along with an identifier (e.g., a domain or a URL) of the organization websites 118a-118n to which the PII was submitted in the PII storage 114 and/or the PII storage 116. The organization webservers 117a-117n may further store the submitted PII in the organization PII storages 122a-122a. Then, at any time, the user 103 is able to request a list of all of the stored PII along with indicators (e.g., website name or organization name) of the organization websites 118a-118n to which the PII was submitted. This list may be generated by the PII application 112 and/or the PII application 115 retrieving each of the encrypted PII along with the identifiers of the organization websites 118a-118n to which the PII was submitted from the PII storage 114 and/or the PII storage 116, decrypting each of the encrypted PII, and displaying each of the PII along with the indicators of the organization websites 118a-118n to which the PII was submitted, such as in the browser 110, or in another application on a display of the client 104. In this manner, even where the user 103 interacts with a large number of the organization websites 118a-118n, the PII application 112 and/or the PII application 115 can automatically and securely track all of the PII that the user 103 shares with the organization websites 118a-118n over time. Then, in the event that the user 103 decides to request that some or all of their shared PII be deleted, the PII application 112 and/or the PII application 115 can quickly generate a list of all of the tracked PII along with indicators of the organization websites 118a-118n to which the PII was submitted, so that the user 103 can easily determine to which of the organization websites 118a-118n the user would like to send a PII deletion request.

Further in some embodiments, the user 103 may easily request that a selected PII (e.g., that the user 103 selects from the displayed list of all shared PII) be deleted by the one of the organization websites 118a-118n (e.g., the organization website 118a) to which the selected PII was submitted. When such a request is received, the PII application 112 and/or the PII application 115 may automatically request deletion of the PII by the organization website 118a on behalf of the user 103. In this manner, the user 103 can automatically accomplish the deletion of their PII from the organization website 118a (e.g., with a single click on a PII to select the PII for deletion or automatic opt-out) without the user frustration that can be associated with a cumbersome and complicated manual deletion request. Further, the user 103 may, in some embodiments, schedule automatic deletions of their PII from selected organization websites on a regular schedule (e.g., daily, weekly, monthly, yearly).

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2A:
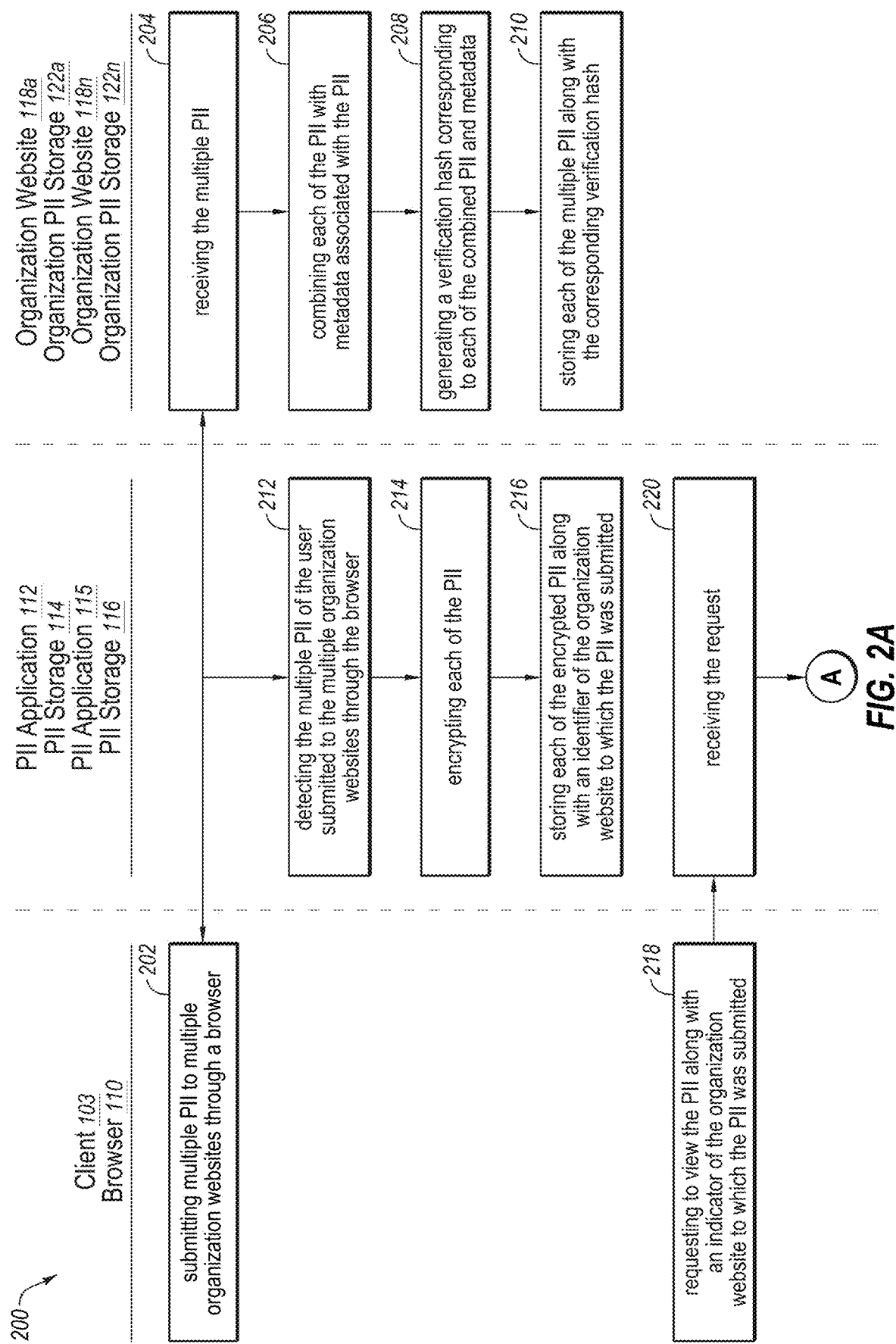
FIGS. 2A-2C are a flowchart of an example method for protecting PII submitted through a browser.
Figure 2B:
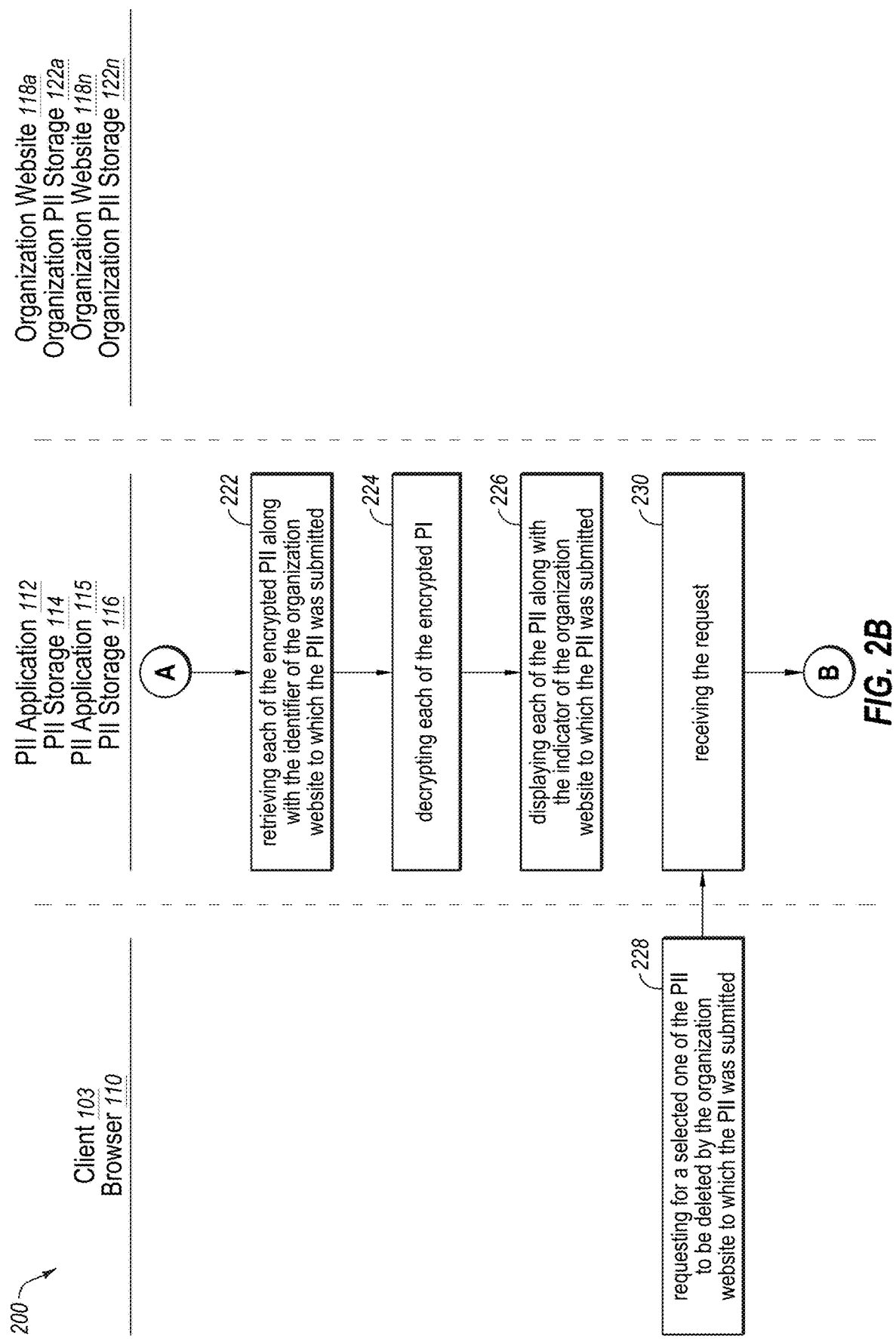
Figure 2C:
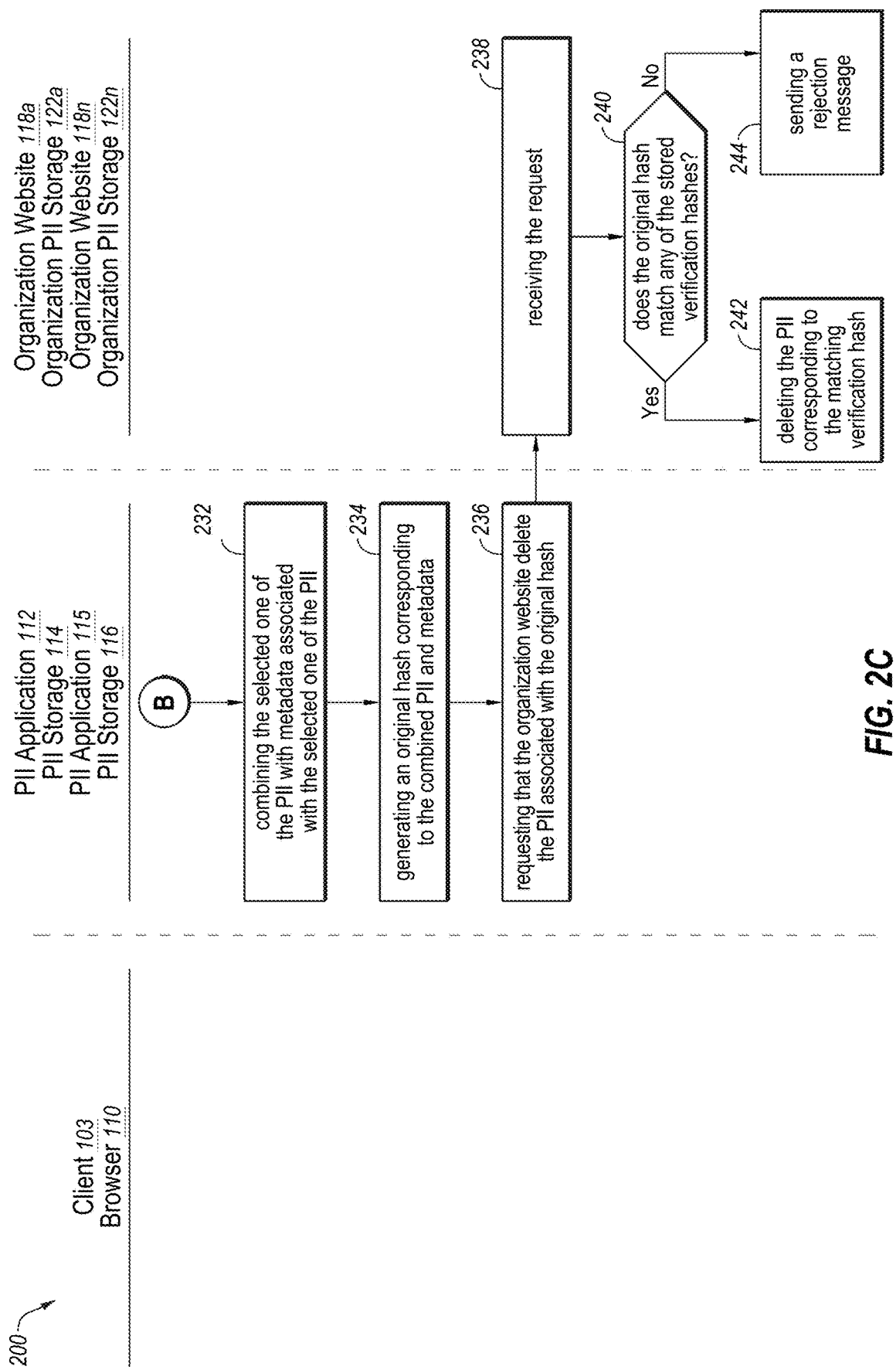

FIGS. 2A-2C are a flowchart of an example method 200 for protecting PII submitted through a browser. The method 200 may be performed, in some embodiments, by a device or system or application, such as by the client 104, the browser 110, the PII application 112, the PII server 106, the PII application 115, the organization servers 108a-108n, the organization webservers 117a-117n, or the organization websites 118a-118n, or some combination thereof. In these and other embodiments, the method 200 may be performed by one or more processors based on one or more computer-readable instructions stored on one or more non-transitory computer-readable media. The method 200 will now be described in connection with FIGS. 1 and 2A-2C.

The method 200 may include, at action 202, submitting multiple PII to multiple organization websites through a browser and, at action 204, receiving the multiple PII. In some embodiments, the receiving of the multiple PII of the user submitted to an organization website may include receiving the multiple PII of the user submitted in one or more web forms of the organization website. For example, the user 103 may submit, at action 202, multiple PII of the user 103 to the organization websites 118a-118n through the browser 110 (e.g., through one or more web forms), and the organization websites 118a-118n may receive, at action 204, the multiple PII of the user 103.

The method 200 may include, at action 206, combining each of the PII with metadata associated with the PII. In some embodiments, the metadata associated with each PII may include a Uniform Resource Locator (URL) of the organization website to which the PII was submitted. In some embodiments, the metadata associated with each PII may include a type indicator of the PII. For example, the organization websites 118a-118n may combine, at action 206, each of the PII with metadata (e.g., a URL, a PII type, a timestamp, etc.) associated with the PII.

The method 200 may include, at action 208, generating a verification hash corresponding to each of the combined PII and metadata. For example, the organization websites 118a-118n may generate, at action 208, a verification hash corresponding to each of the combined PII and metadata. In some embodiments, the generation of the verification hash may be accomplished using a hash algorithm that is known to both the organization websites 118a-118n as well as being known to the PII application 112 and/or the PII application 115, which may enable the independent generation of identical hashes given identical input to the hash algorithm.

The method 200 may include, at action 210, storing each of the multiple PII along with the corresponding verification hash. For example, the organization websites 118a-118n may store, at action 210, each of the multiple PII along with the corresponding verification hash in the organization PII storages 122a-122n.

The method 200 may include, at action 212, detecting the multiple PII of the user submitted to the multiple organization websites through the browser. For example, the PII application 112 and/or the PII application 115 may detect, at action 212, the multiple PII of the user 103 submitted to the multiple organization websites 118a-118n through the browser 110.

The method 200 may include, at action 214, encrypting each of the PII. For example, the PII application 112 and/or the PII application 115 may encrypt, at action 214, each of the PII. In some embodiment, only the user 103 may have access to a key used to encrypt and decrypt the user's PII, thus enabling the encrypted PII to remain secure and in the control of the user 103.

The method 200 may include, at action 216, storing each of the encrypted PII along with an identifier of the organization website to which the PII was submitted. For example, the PII application 112 and/or the PII application 115 may store, at action 216, each of the encrypted PII, along with an identifier (e.g., a domain or a URL) of the organization website to which the PII was submitted, such as locally in the PII storage 114 and/or remotely in the PII storage 116 and/or in a blockchain.

In some embodiments, the PII encrypted and stored at action 214 and 216 may include only a portion of the actual PII submitted at action 202. For example, for a social security number or a credit card, only the last four digits may be encrypted and stored, whereas for an email address or a physical address, the entire address may be encrypted and stored.

The method 200 may include, at action 218, requesting to view the PII along with an indicator of the organization website to which the PII was submitted and, at action 220, receiving the request. For example, the user 103 may request, at action 218, to view all of the PII that the user 103 has submitted to the organization websites 118a-118n, along with an indicator (e.g., a website name or an organization name) of the organization website to which the PII was submitted, and the PII application 112 and/or the PII application 115 may receive, at action 220, the request. In some embodiments, the request at action 218 may be accomplished in the browser 110 or in another application on the client 104.

The method 200 may include, at action 222, retrieving each of the encrypted PII along with the identifier of the organization website to which the PII was submitted. For example, the PII application 112 and/or the PII application 115 may retrieve, at action 222, each of the encrypted PII, along with the identifier (e.g., a domain or a URL) of the organization website to which the PII was submitted, from the PII storage 114 and/or from the PII storage 116 and/or from a blockchain.

The method 200 may include, at action 224, decrypting each of the encrypted PII. For example, the PII application 112 and/or the PII application 115 may decrypt, at action 224, each of the encrypted PII.

The method 200 may include, at action 226, displaying each of the PII along with the indicator of the organization website to which the PII was submitted. For example, the PII application 112 and/or the PII application 115 may display, at action 226, displaying each of the PII along with the indicator (e.g., a website name such as "Amazon Store" or "Gmail Inbox" or an organization name such as "Amazon" or "Gmail") of the organization website to which the PII was submitted. This display may be accomplished on the client 104 or on some other device, such as by displaying a list of all of the PII and the corresponding organization websites in a webpage, in an email, in a text message, or in another communication.

The method 200 may include, at action 228, requesting for a selected one of the PII to be deleted by the organization website to which the PII was submitted and, at action 230 receiving the request. For example, the user 103 may request, at action 228, for a selected one of the PII to be deleted (e.g., selected by the user 103 by clicking on one of the PII from the displayed list of PII) by the organization website 118a to which the PII was submitted, and the PII application 112 and/or the PII application 115 may, at action 230, receive the request.

The method 200 may include, at action 232, combining the selected one of the PII with metadata associated with the selected one of the PII. In some embodiments, the metadata associated with the selected one of the PII may include a Uniform Resource Locator (URL) of the organization website to which the selected one of the PII was submitted. Additionally or alternatively, in these embodiments, the metadata associated with the selected one of the PII may include a type indicator of the selected one of the PII. For example, the PII application 112 and/or the PII application 115 may combine, at action 232, the selected one of the PII with metadata (e.g., the URL 120a and/or a type of the PII such as name, social security number, date of birth, place of birth, mother's maiden name, etc.) associated with the selected one of the PII.

The method 200 may include, at action 234, generating an original hash corresponding to the combined PII and metadata. Additionally or alternatively, the method may further include storing the original hash in a blockchain. For example, the PII application 112 and/or the PII application 115 may generate, at action 234, an original hash corresponding to the combined PII and metadata, and may potentially store the original hash in a blockchain.

The method 200 may include, at action 236, requesting that the organization website delete the PII associated with the original hash and, at action 238, receiving the request. Additionally or alternatively, the method may further include storing, in a blockchain, the request for the organization website to delete the PII associated with the original hash. For example, the PII application 112 and/or the PII application 115 may request, at action 236, that the organization website 118a delete the PII associated with the original hash, and the organization website 118a may receive the request at action 238, and potentially this request may be stored in a blockchain.

The method 200 may include, at action 240, determining whether the original hash matches any of the stored verification hashes. If so (yes at action 240), the method 200 may include, at action 242, deleting the PII corresponding to the matching verification hash. If not (not at action 240), the method 200 may include, at action 244, sending a rejection message. For example, the organization website 118a may determine, at action 240, whether the original hash (received at action 238) matches any of the verification hashes that were previously stored in the organization PII storage 122a (stored at action 210).

In some embodiments, the determining at action 240 may further include determining that the specified hash is found in a blockchain storing hashes corresponding to PII for which deletion is authorized. In these embodiments, the deleting at action 242 may be further performed in response to the determining that the specified hash is found in the blockchain.

The method 200 may thus be employed, in some embodiments, to enable the user 103 to more easily protect their PII that they have shared with the organization websites 118a-118n through their browser 110, even where the user 103 generally interacts with a large number of the organization websites 118a-118n and is unable to remember all of the organization websites 118a-118n with which the user 103 has shared their PII. For example, the method 200 may be employed by the PII application 112 and/or the PII application 115 to automatically and securely track all of the PII that the user 103 shares with the organization websites 118a-118n over time through the browser 110. Then, in the event that the user 103 decides to request that some or all of their shared PII be deleted, the method 200 may be employed by the PII application 112 and/or the PII application 115 to quickly generate a list of all of the shared PII along with indicators of the organization websites 118a-118n to which the PII was submitted, so that the user 103 can easily determine to which of the organization websites 118a-118n the user would like to send a PII deletion request. Further, the method 200 may enable the user 103 to automatically accomplish the deletion of their PII from the organization website 118a (e.g., with a single click on a PII to select the PII for deletion or automatic opt-out) without the user frustration that can be associated with a cumbersome and complicated manual deletion request. Also, the method 200 may be employed to avoid original PII needing to be sent along with a PII deletion request, thus avoiding additional security and privacy concerns associated with the resending of PII in a PII deletion request. Further, the method 200 may enable the organization website 118a that receives a PII deletion request to easily locate the PII (e.g., by looking up the PII by the hash in the organization PII storage 122a) and/or to be confident that the PII deletion request is actually authorized by the user 103 to whom the PII belongs.

Although the actions of the method 200 are illustrated in FIGS. 2A-2C as discrete actions, various actions may be divided into additional actions, combined into fewer actions, reordered, expanded, or eliminated, depending on the desired implementation. For example, in some embodiments, actions 212, 214, 216, 220, 222, 224, and 226 may be performed without performing the other actions of the method 200. In another example, in some embodiments, actions 204, 206, 208, 210, 238, 240, and 242 may be performed without performing the other actions of the method 200. In another example, in some embodiments, the actions 232 and 234 may be performed between the actions 212 and 216, and then the hashes may be stored in the action 216 and retrieved prior to the action 236.

Further, it is understood that the method 200 may improve the functioning of a computer system itself and/or may improve the technical field of PII protection. For example, the functioning of any of the client 104, the PII server 106, and/or the organization servers 108a-108n of FIG. 1 may itself be improved by the method 200 enabling all PII submitted through the browser 110 to be automatically detected, encrypted, stored, retrieved, decrypted, and displayed, as well as selected for an automatic PII deletion request.

FIG. 3 illustrates an example computer system 300 that may be employed in protecting PII submitted through a browser. In some embodiments, the computer system 300 may be part of any of the systems or devices described in this disclosure. For example, the computer system 300 may be part of any of the client 104, the PII server 106, and the organization servers 108a-108n of FIG. 1.

The computer system 300 may include a processor 302, a memory 304, a file system 306, a communication unit 308, an operating system 310, a user interface 312, and an application 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software applications and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more actions of the method 200 of FIGS. 2A-2C.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more actions of the method 200 of FIGS. 2A-2C. These computer-executable instructions may be included, for example, in the operating system 310, in one or more applications, such as the browser 110, the PII application 112, the PII application 115, or the organization webservers 117a-117n of FIG. 1, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The application 314 may be one or more computer-readable instructions stored on one or more non-transitory computer-readable media, such as the memory 304 or the file system 306, that, when executed by the processor 302, is configured to perform one or more actions of the method 200 of FIGS. 2A-2C. In some embodiments, the application 314 (e.g., app) may be part of the operating system 310 or may be part of an application of the computer system 300, or may be some combination thereof. In some embodiments, the application 314 may function as any of the browser 110, the PII application 112, the PII application 115, or the organization webservers 117a-117n of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general-purpose computer (e.g., the processor 302 of FIG. 3) including various computer hardware or software applications, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting personally identifiable information (PII) submitted through a browser, at least a portion of the method being performed by a computer device comprising one or more processors, the computer-implemented method comprising:
   detecting multiple PII of a user submitted to multiple organization websites through a browser;
   encrypting each of the PII;
   storing each of the encrypted PII along with an identifier of the organization website to which the PII was submitted;
   receiving a request to view the PII along with an indicator of the organization website to which the PII was submitted;
   retrieving each of the encrypted PII along with the identifier of the organization website to which the PII was submitted;
   decrypting each of the encrypted PII;
   displaying each of the PII along with the indicator of the organization website to which the PII was submitted;
   receiving a request from the user for a selected one of the PII to be deleted by the organization website to which the selected one of the PII was submitted;
   combining the selected one of the PII with metadata associated with the selected one of the PII;
   generating an original hash corresponding to the combined PII and metadata;
   sending the original hash corresponding to the combined PII and metadata to the organization website to which the selected one of the PII was submitted; and
   requesting the organization website to delete the PII associated with a verification hash generated by the organization website that matches the original hash.

2. The computer-implemented method of claim 1, wherein the detecting of the multiple PII is performed by the browser or by a plugin of the browser.

3. The computer-implemented method of claim 1, wherein:
   the metadata associated with the selected one of the PII includes a Uniform Resource Locator (URL) of the organization website to which the selected one of the PII was submitted.

4. The computer-implemented method of claim 1, further comprising:
   storing the original hash in a blockchain.

5. A computer-implemented method for protecting personally identifiable information (PII) submitted through a browser, at least a portion of the method being performed by a computer device comprising one or more processors, the computer-implemented method comprising:
   receiving multiple PII of a user submitted to an organization website through a browser;
   combining each of the PII with metadata associated with the PII;
   generating a verification hash corresponding to each of the combined PII and metadata;
   storing each of the PII along with the corresponding verification hash;
   receiving a request for the organization website to delete PII associated with a specified hash;
   determining that the specified hash matches a particular one of the verification hashes; and
   in response to the determining that the specified hash matches the particular one of the verification hashes, deleting the PII associated with the particular one of the verification hashes.

6. The computer-implemented method of claim 5, wherein the receiving of the multiple PII of the user submitted to the organization website comprising receiving the multiple PII of the user submitted in one or more web forms of the organization website.

7. The computer-implemented method of claim 5, wherein:
the metadata associated with each PII includes a Uniform Resource Locator (URL) of the organization website to which the PII was submitted.

8. The computer-implemented method of claim 5, wherein:
the metadata associated with each PII includes a type indicator of the PII.

9. The computer-implemented method of claim 5, wherein the determining that the specified hash matches the particular one of the verification hashes further comprises determining that the specified hash is found in a blockchain storing hashes corresponding to PII for which deletion is authorized.

10. The computer-implemented method of claim 9, wherein the deleting of the PII associated with the particular one of the verification hashes is further performed in response to the determining that the specified hash is found in the blockchain thereof.

11. The computer-implemented method of claim 1, wherein each of the encrypted PII is stored locally.

12. The computer-implemented method of claim 1, wherein:
the metadata associated with the selected one of the PII includes a type indicator of the selected one of the PII.

13. The computer-implemented method of claim 1, further comprising:
storing, in a blockchain, the request for the organization website to delete the PII associated with the original hash.

* * * * *